US012753034B2

(12) United States Patent
Hack et al.

(10) Patent No.: US 12,753,034 B2
(45) Date of Patent: Oct. 6, 2026

(54) MOBILE ROBOT AND METHOD FOR CHANGING LABEL ROLLS ON A LABELING ASSEMBLY

(71) Applicant: KRONES AG, Neutraubling (DE)

(72) Inventors: Andreas Hack, Osterhofen (DE); Manuel Kraus, Neuburg an der Donau (DE)

(73) Assignee: KRONES AG, Neutraubling (DE)

( * ) Notice: Subject to any disclaimer, the term of this patent is extended or adjusted under 35 U.S.C. 154(b) by 224 days.

(21) Appl. No.: 18/695,675

(22) PCT Filed: Jul. 11, 2022

(86) PCT No.: PCT/EP2022/069241
§ 371 (c)(1),
(2) Date: Mar. 26, 2024

(87) PCT Pub. No.: WO2023/051969
PCT Pub. Date: Apr. 6, 2023

(65) Prior Publication Data
US 2024/0409347 A1 Dec. 12, 2024

(30) Foreign Application Priority Data
Sep. 28, 2021 (DE) ..................... 10 2021 125 133.8

(51) Int. Cl.
*B65H 19/12* (2006.01)
*B25J 5/00* (2006.01)
(Continued)

(52) U.S. Cl.
CPC .............. *B65H 19/12* (2013.01); *B25J 5/007* (2013.01); *B65C 9/1892* (2013.01);
(Continued)

(58) Field of Classification Search
CPC ...... B25J 5/007; B65C 9/1892; B65H 19/105; B65H 19/12; B65H 2301/415095; B65H 2301/418; B65H 2801/75
See application file for complete search history.

(56) References Cited

U.S. PATENT DOCUMENTS 4,764,078 A 8/1988 Neri
5,274,984 A * 1/1994 Fukuda .................. B65B 41/16
414/908
(Continued)

FOREIGN PATENT DOCUMENTS

CN 106628348 A 5/2017
CN 208869042 U 5/2019
(Continued)

OTHER PUBLICATIONS

ISA European Patent Office, International Search Report Issued in Application No. PCT/EP2022/069241, Nov. 24, 2022, WIPO, 4 pages.
(Continued)

*Primary Examiner* — Saul Rodriguez
*Assistant Examiner* — Brendan P Tighe
(74) *Attorney, Agent, or Firm* — McCoy Russell LLP

(57) ABSTRACT

The invention relates to a mobile robot, to a supply system, and to a method for changing label rolls on a labeling assembly for labeling containers. The mobile robot accordingly comprises a vehicle unit for changing locations of the robot and a manipulator unit with a multi-axle manipulator and an associated end effector for manipulating label rolls. Because the end effector is designed to grip the outer circumference of the label rolls and emptied roll cores of label rolls so as to carry them, ergonomically problematic
(Continued)

work steps when introducing label rolls can be accomplished exclusively by machine with a high degree of precision and in a material-saving manner.

17 Claims, 6 Drawing Sheets

(51) Int. Cl.
*B65C 9/18* (2006.01)
*B65H 19/10* (2006.01)

(52) U.S. Cl.
CPC ...................... *B65H 19/105* (2013.01); *B65H 2301/415095* (2013.01); *B65H 2301/418* (2013.01); *B65H 2801/75* (2013.01)

(56) References Cited

U.S. PATENT DOCUMENTS

| | | | | |
|---|---|---|---|---|
| 9,051,072 | B2 | 6/2015 | Eder et al. | |
| 10,343,865 | B2 * | 7/2019 | Wimmer | B65H 19/123 |
| 10,577,209 | B2 * | 3/2020 | Wimmer | B65H 19/12 |
| 10,676,303 | B2 * | 6/2020 | Prankl | B65H 19/12 |
| 12,421,068 | B2 * | 9/2025 | Perini | B65H 19/12 |
| 12,591,256 | B2 * | 3/2026 | Yamashita | B65G 65/00 |
| 2001/0045490 | A1 * | 11/2001 | Kiprowski | B66C 1/0293 242/560 |
| 2016/0060062 | A1 * | 3/2016 | Macura | B65H 19/1805 242/551 |
| 2020/0156813 | A1 * | 5/2020 | Wipf | B25J 15/0047 |
| 2022/0410399 | A1 * | 12/2022 | Yoshikuwa | B25J 5/007 |

FOREIGN PATENT DOCUMENTS

| | | | |
|---|---|---|---|
| DE | 3615309 | C2 | 7/1996 |
| DE | 102017206549 | A1 | 10/2018 |
| EP | 1157952 | A2 | 11/2001 |
| EP | 2061702 | B1 | 12/2011 |
| EP | 3473570 | A1 | 4/2019 |
| WO | 2021107086 | A1 | 6/2021 |

OTHER PUBLICATIONS

State Intellectual Property Office of the People's Republic of China, Search Report Issued in Application No. 202280063198.0, Apr. 1, 2026, 6 pages. (Submitted with Machine Translation).

* cited by examiner

MOBILE ROBOT AND METHOD FOR CHANGING LABEL ROLLS ON A LABELING ASSEMBLY

CROSS REFERENCE TO RELATED APPLICATIONS

The present application is a U.S. National Phase of International Application No. PCT/EP2022/069241 entitled "MOBILE ROBOT AND METHOD FOR CHANGING A LABEL ROLL ON A LABELING ASSEMBLY," and filed on Jul. 11, 2022. International Application No. PCT/EP2022/069241 claims priority to German Patent Application No. 10 2021 125 133.8 filed on Sep. 28, 2021. The entire contents of each of the above-listed applications are hereby incorporated by reference for all purposes.

TECHNICAL FIELD

The invention relates to a mobile robot and to a method for changing label rolls on a labeling assembly for labeling containers.

BACKGROUND AND SUMMARY

Introducing label rolls into such labeling assemblies generally takes place manually by operators in that, for example, label rolls are inserted into a roll magazine, known from EP 2 061 702 B1, in the area of the labeling machine to be supplied. From there, the label rolls can then be transferred by machine to the labeling machine. The insertion of the label strip, present on the introduced roll, for subsequent connection of its start to the end of a label strip, just processed by the labeling machine, for a continuous strip supply is in principle possible both manually and automatically.

For the machine material supply with film material or the like, a mobile robot unit for handling consumable material is known from DE 10 2017 206 549 A1, an automated system for supplying production material and/or packaging material is known from DE 36 15 309 C2, and a rail-guided robot for transferring film rolls with the aid of an arm, pivotable about a horizontal axis, with a mandrel is known from EP 3 473 570 A1.

However, such machine supply systems have proven to be impractical and/or too complicated for introducing label rolls into labeling machines. Depending upon the machine performance, a label roll is to be introduced every 25 to 100 minutes, for example. In the meantime, such machine systems are not fully utilized, so that an unfavorable cost-benefit ratio arises with regard to equipment cost and space requirement.

Consequently, label rolls are still predominantly introduced manually, for which purpose the comparatively heavy label rolls are removed from pallets and lifted onto the associated labeling assembly. This is ergonomically unfavorable and also requires the regular presence of an operator for changing label rolls.

On the other hand, there is therefore a need for improved apparatuses and methods for introducing label rolls into labeling assemblies for containers, such as bottles.

The stated object is achieved with a mobile robot according to claim 1, a supply system with the mobile robot according to claim 10, and a method for changing label rolls according to claim 11.

The mobile robot accordingly serves to change label rolls on a labeling assembly for labeling containers and comprises a motorized vehicle unit for changing locations of the robot and a manipulator unit with a multi-axle manipulator and associated end effector for manipulating label rolls. The end effector is designed to grip the outer circumference of the label rolls and emptied roll cores of label rolls so as to carry them. In addition, the end effector can be designed to grip the label rolls from the inside, i.e., at the roll cores.

As a result, introducing label rolls into the labeling assembly, which is problematic from an ergonomic point of view, can be performed by the mobile robot without physical work by an operator. Likewise, the sleeve-shaped/annular/tubular roll cores of the label rolls can be removed by machine from the relevant receiving plate/roll plate of the labeling assembly before the respective introduction of a label roll. The external grip of the end effector is advantageous both when depositing the label rolls onto the roll plates and when removing the emptied roll cores, since the roll cores in the area of the roll plates are generally pushed over expansion valves or similar fastening mandrels of the roll plate and cannot be handled there with an internal grip.

Between individual changes of label rolls, the mobile robot is available for other tasks—for example, for introducing label rolls into other labeling assemblies. Furthermore, the space requirement for label roll magazines in the area of labeling machines can be reduced or avoided.

The multi-axle manipulator is preferably a 6-axle articulated arm manipulator, which enables both pivoting movements and rotating movements of the label rolls about themselves.

The term, "mobile robot," is to be understood to mean that the robot as a whole is not bound to a particular location but can, for example, be moved in a factory building from one place of use to another place of use. This change in location can take place autonomously, i.e., by an autonomous movement of the mobile robot substantially without additional monitoring or control by an operator. Alternatively, the change in location, i.e., the movement of the mobile robot, can also be controlled by an operator.

The vehicle unit is thus preferably designed as an automatically guided vehicle (AGV) in the general sense. Specifically, it can be an autonomous mobile robot (AMR), which is also referred to as an autonomous intelligent vehicle (AIV), or a self-guided vehicle (SGV) or, for example, a laser-guided vehicle (LGV). The functions and components of such vehicles/vehicle units are in principle known with regard to their drives and control systems and are therefore not described in detail below.

The mobile robot can be a so-called collaborating robot (COBOT), which is equipped with corresponding safety devices for use in the working environment of operators, which safety devices are also known in principle and are therefore not described in detail. However, it can also be a conventional industrial robot that is equipped with safety devices, e.g., laser scanners, and is operated in a coexisting manner. This means that several safety areas around the robot are monitored by the respective safety devices. If an operator approaches, the robot first becomes slower and then switches off when the innermost safety zone is entered. It autonomously starts again when the operator leaves the area.

The vehicle unit comprises an autonomous drive and an autonomous controller, which enables the described change in location between a label roll store and the labeling assembly to be supplied, for example. The vehicle unit can also be referred to as a driverless transport vehicle. Both terms are used synonymously.

It may be that the driverless transport vehicle is connected to a sensor system, via which the driverless transport vehicle detects an actual position of the assigned manipulator unit and, taking into account the detected actual position, can move into a receiving position suitable for autonomously receiving the manipulator unit. For this purpose, the sensor system can, for example, comprise a laser scanner for locating the manipulator unit.

It may also be that the driverless transport vehicle has a plug and that the manipulator unit comprises a corresponding socket (or vice versa). The plug and socket can be automatically connected to one another via an actuator designed as a component of the transport apparatus, in order to establish an electrical, pneumatic, and/or hydraulic connection between the driverless transport vehicle and the assigned manipulator unit. For example, an actuator of the driverless transport vehicle that can be moved upwards in the vertical direction has proven effective for this purpose. The driverless transport vehicle can also have a lifting device, whose stroke can establish/detach the above plug connection.

For further embodiments, it is also conceivable for the manipulator unit to be inductively supplied with electrical energy by the transport vehicle. Work instructions or similar data could be transmitted wirelessly/by radio to the manipulator unit.

The manipulator unit comprises a table frame and a tabletop, which form a tunnel which is delimited thereby and into which the driverless transport vehicle can drive in order to receive the manipulator unit. In order to enable this to be as precise and collision-free as possible, the manipulator unit has, for example, reference bars, which preferably each have a triangular geometry and can be arranged between two respective table legs of the manipulator unit. By means of a sensor-based detection of the reference bars, the driverless transport vehicle can detect the relative position of the manipulator unit and move accurately into the tunnel of the manipulator unit.

In order that the driverless transport vehicle can lift the manipulator unit from the ground in a stable relative position and move it to another location, the manipulator unit preferably has centering pins, which can dip into corresponding centering bushes of the driverless transport vehicle. As a result, the manipulator unit is aligned to the driverless transport vehicle and subsequently remains in a predefined relative position on the driverless transport vehicle. Preferably, the dipping of the centering pins into the centering bushes is monitored electronically, and the departure for a change in location is permitted by the assigned controller only in the case of a centering connection confirmed by machine in this way. Safe transport of the label rolls is thus provided. Defective roll transfers can also be avoided by a thus ensured correct relative positioning of the manipulator unit and transport unit/labeling assembly.

In order to fix the manipulator unit on the driverless transport vehicle in a predefined relative position, the manipulator unit preferably has locking means, which are, for example, designed as clamping pins. The latter then interact with a clamping mechanism, e.g., clamping chucks, of the driverless transport vehicle. Such a locking can be controlled and monitored automatically. The common departure for a change in location is permitted by the assigned controller only in the case of a locking confirmed by machine in this way.

The end effector is preferably further designed to engage in the roll cores of the label rolls in such a way that the label rolls can be carried and deposited with an internal grip. This is to be understood to mean that the internal grip caused thereby makes it possible to carry at least one label roll to be introduced. Thus, the label rolls can, for example, be picked up from a stack with several label rolls and/or from pallets, without having to grip the label rolls at their outer circumference and/or having to engage under (between) label rolls. This enables gentle and safe handling of provided label rolls lying on a pallet or in a label magazine.

For this purpose, the end effector can comprise a roll gripper with gripping elements that are designed on their inner side for an external grip of the label rolls and on their outer side for an internal grip of the label rolls. The gripping elements can, for example, be moved towards and apart from one another on a linear unit in such a way that both the external grip and the internal grip are possible with the same roll gripper.

The vehicle unit and the manipulator unit are preferably designed as modules that can be coupled to one another and detached from one another by means of a lifting unit formed in particular on the vehicle unit, in such a way that the manipulator unit can be lowered with respect to the vehicle unit for stationary parking and/or docking to the labeling assembly, and can in contrast be lifted again to change locations. The vehicle unit can, for example, autonomously pick up the manipulator unit by lifting the lifting unit and establish a connection for supplying energy to the manipulator unit. Likewise, the manipulator unit can be set down in a stable and stationary manner at the place of use, so that the vehicle unit can drive to another place of use, if necessary. The manipulator unit can thus be operated on the vehicle unit or, when set down, can be operated independently thereof.

The vehicle unit and manipulator unit can be connected to one another in a reproducible relative position via a guiding mechanism and/or centering mechanism so that a predefined working position of the manipulator unit can be determined and assumed by means of a navigation system provided on the transport unit. For this purpose, a clamping system, which is in particular self-centering, can, for example, be present—for example, with at least one clamping pin provided on the manipulator unit and at least one associated clamping chuck on the vehicle unit—or vice versa. Such a clamping mechanism is preferably controlled by the vehicle unit, but this is also possible by the manipulator unit.

Preferably, the manipulator unit comprises a table frame and a tabletop, under which the vehicle unit can drive and on which the multi-axle manipulator is mounted. This enables a stable stationary arrangement of the manipulator unit in the area of the labeling assembly and its mounting, which is both space-saving and also stable with regard to the center of gravity, on the vehicle unit. In other words, the manipulator unit then comprises a tunnel that is located under the multi-axle manipulator and into which the vehicle unit can drive.

Preferably, the manipulator unit comprises a label roll magazine for receiving at least two—in particular, at least four—label rolls in their lying alignment and a deposition site for temporarily depositing a label roll during manipulation—in particular, for changing the end effector from an internal grip to an external grip. This facilitates the removal of the respective label roll from the label roll magazine and, where applicable, a turning of the label roll according to the intended working direction of rotation of the label roll.

Preferably, the end effector further comprises an adhesion gripper, electrostatic gripper, or suction gripper for gripping free label tape ends of label rolls. In this way, the label strip present on the introduced label roll can be inserted into a connection unit of the labeling assembly by machine, and in particular automatically. It is also conceivable that an adhesion gripper, electrostatic gripper, or suction gripper and, where applicable, assigned compressed air connectors be attached to a separate end effector, which can be automatically changed by the robot by means of a gripper changing system.

Preferably, a compressed air connector for providing compressed air is also arranged on the end effector in order to thereby actuate expansion valves for fixing/releasing label rolls on the roll plates of the labeling assembly. Before the removal of an emptied roll core, for example, the compressed air connector is attached to the corresponding connector of the expansion valve in order to release the roll core. Accordingly, after the respective label roll has been placed onto the roll plate, for example, the compressed air connector is attached to the expansion valve in order to fix/center the label roll on the roll plate.

As a result, the removal of the emptied roll cores and the introduction of the label rolls into the respective roll plate can take place by machine, and in particular fully automatically.

Preferably arranged on the end effector are also sensors—in particular, ultrasonic sensors—for determining the relative position of a label roll received by the end effector in each case. As a result, the relative position of the label roll with respect to the end effector can be determined for the subsequent manipulation of the label roll, for example, in the sense of a relative centering, and the associated movements during the manipulation of the label roll can be performed precisely.

The manipulator unit preferably comprises at least one interface—in particular, a plug connection—for selective electrical energy supply of the multi-axle manipulator from the vehicle unit or from a labeling assembly. As a result, the necessary drive and control functions of the multi-axle manipulator can be performed both autarkically by the mobile robot and in combination with the respectively assigned labeling assembly if the vehicle unit has been separated/driven away.

The supply system described serves to introduce a label roll into a labeling assembly for labeling containers and comprises not only the mobile robot according to at least one of the described embodiments, but also the associated labeling assembly, on which roll plates for receiving and unwinding label rolls are formed, and a connection unit, by means of which the label strip of the introduced label roll can be connected to a label strip guided through the labeling assembly to the containers. The mobile robot then fully automatically cooperates in particular with the roll plates present on the labeling assembly and with the expansion valves present thereon, and with the connection unit. In principle, however, manually connecting the introduced label strip to the label strip just processed in the labeling assembly would also be possible.

The method described serves to change label rolls on a labeling assembly for labeling containers, wherein, by means of a multi-axle manipulator and an end effector formed thereon, a mobile robot removes at least one emptied roll core of a label roll with an external grip from the labeling assembly and introduces a label roll with an external grip there in exchange. This is to be understood to mean that the label roll and the roll core are manipulated with an external grip at least in the area of roll plates present on the labeling assembly. Outside the labeling assembly, the label rolls can in particular be temporarily manipulated with an internal grip—for example, when picking up the label rolls from a label roll magazine.

Preferably, the mobile robot first in particular picks up the label rolls by means of the end effector with an internal grip and deposits them in a roll magazine carried along on the mobile robot. The label rolls are then transported—in particular, in a lying state—in the roll magazine to the labeling assembly, and provided for changing label rolls. This enables comparatively gentle transport and simple and gentle handling during the manipulation on the labeling assembly.

During the change of label rolls, the manipulator unit is preferably operated (as a mobile robot) on a modular vehicle unit comprised by the mobile robot.

In an alternative embodiment, a modular vehicle unit comprised by the mobile robot sets down a manipulator unit, also comprised by the mobile robot, with the multi-axle manipulator in a stationary manner in the area of the labeling assembly, and in particular docks the manipulator unit thereto. This enables a stable working position of the mobile robot in the area of the labeling assembly and, where applicable, a media supply from the labeling assembly, so that the vehicle unit can be driven to another place of use, if necessary. In the meantime, label rolls can continue to be introduced as long as at least one label roll can be held available in the roll magazine of the manipulator unit.

Preferably, after positioning the manipulator unit at the labeling assembly, the vehicle unit uncouples from the manipulator unit and—in particular, before re-coupling—drives to at least one other modular manipulator unit and forms, e.g., temporarily, a further mobile robot therewith. As a result, the equipment cost for the introduction of the label rolls and, where applicable, further supply tasks to be performed can be reduced. In addition, different vehicle units can be combined with a particular manipulator unit in a modular manner to form a mobile robot, e.g., a vehicle unit that is currently located in the vicinity of the labeling assembly or the manipulator unit and/or is currently ready for use and available.

A free label strip end of the introduced label roll is preferably picked up by an adhesion gripper, electrostatic gripper, or suction gripper arranged on the end effector and is transferred to a connection unit, formed on the labeling assembly, for connecting label strips. This enables automatic, continuous provision of label strips.

BRIEF DESCRIPTION OF THE FIGURES

A preferred embodiment of the invention is illustrated in the drawing. In the figures.

DETAILED DESCRIPTION

Figure 1:
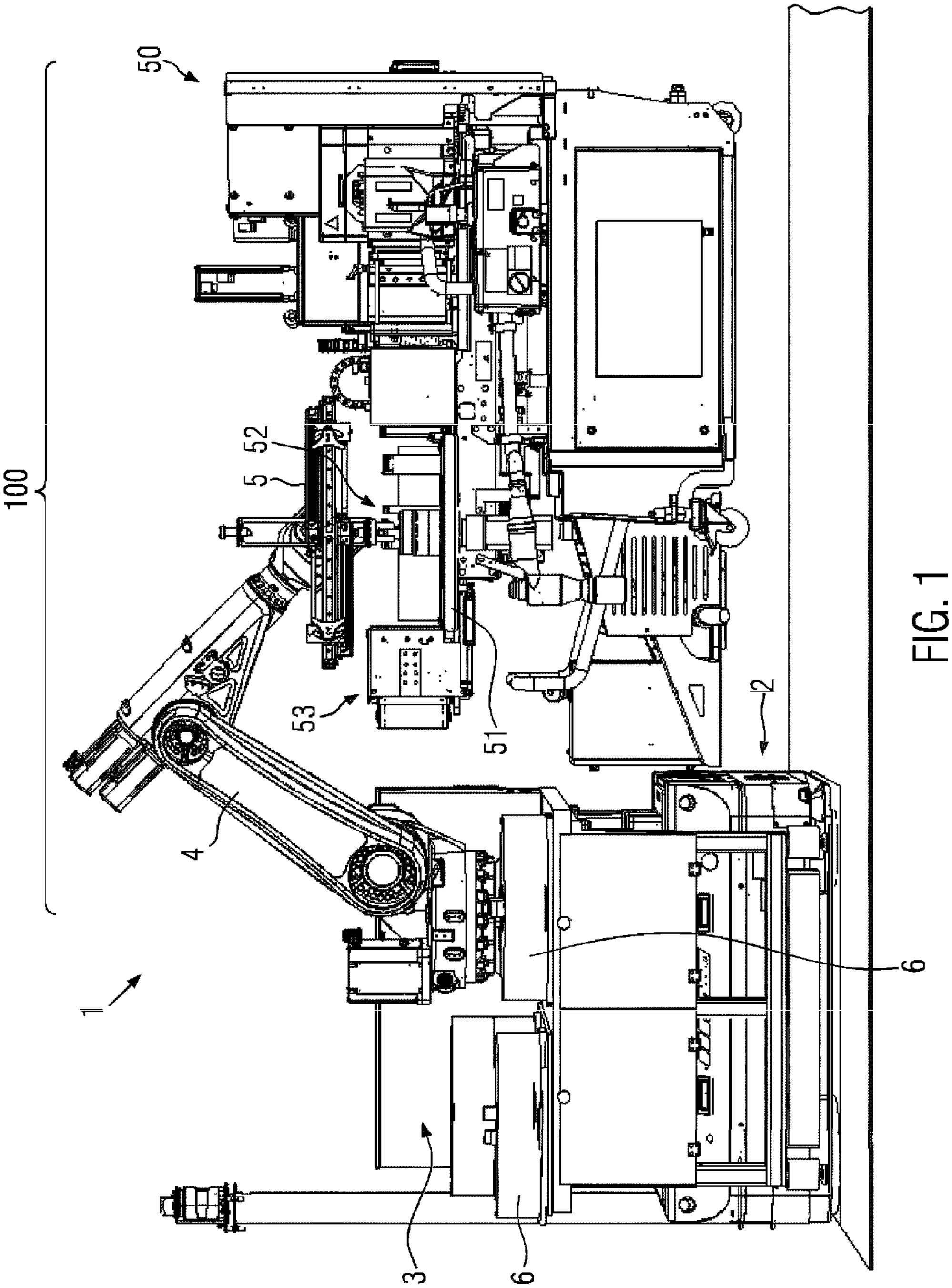
FIG. 1 shows a supply system with a mobile robot and a labeling assembly.

FIG. 1 shows the described supply system 100 with the mobile robot 1 when actuating an expansion valve 52 present at a roll plate 51 of a labeling assembly 50. A connection unit 53, which is formed on the labeling assembly 50 and the function of which is described below, can also be seen.

Figure 3:
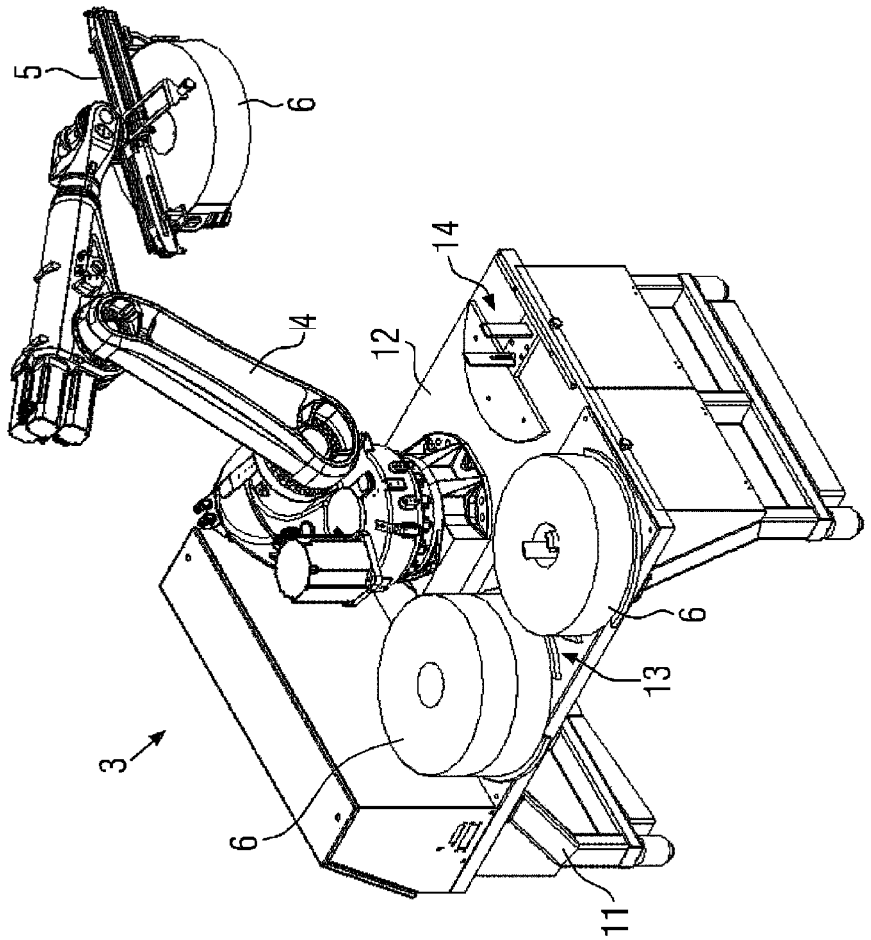
FIG. 3 shows a manipulator unit with a multi-axle manipulator working with an external grip.
Figure 2:
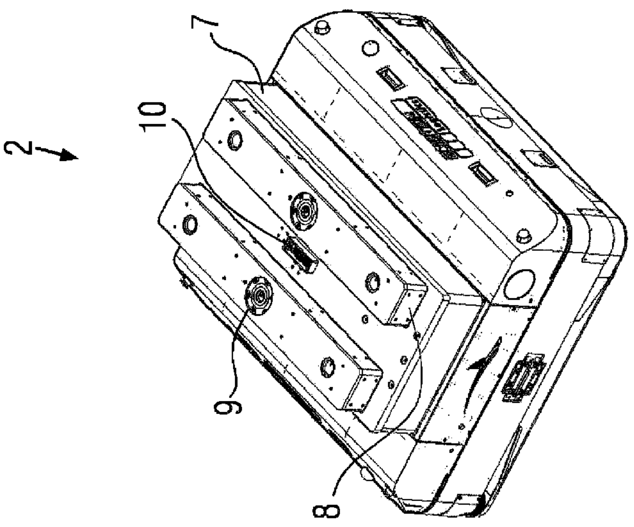
FIG. 2 shows a vehicle unit.

As can be seen in a combination of FIGS. 1 to 3, the mobile robot 1 comprises a vehicle unit 2 for changing locations of the mobile robot 1, and a manipulator unit 3 with a multi-axle manipulator 4. The latter comprises an end effector 5 for manipulating label rolls 6 and emptied roll cores 6*a* of the label rolls 6; see also FIGS. 4 and 6 to 8.

As can also be seen from FIGS. 3 to 8, the end effector 5 is designed to grip not only the outer circumference, but also the inner circumference of the label rolls 6 and of their emptied roll cores 6*a* so as to carry them. In the sense of the present invention, this is also referred to as an external grip and internal grip. The label rolls 6 to be introduced are known to consist of a roll core 6*a* and a label strip 6*b* wound thereon. Consequently, with an internal grip, the label rolls 6 to be introduced are held and carried at the inner circumference of the roll cores 6*a*.

FIG. 2 also shows that the vehicle unit 2 has a lifting unit 7 with preferably rail-like guides 8 and locking elements 9 preferably designed as clamping devices, and a plug connection 10 for the electrical supply and/or control of the manipulator unit 3.

FIG. 3 also shows that the manipulator unit 3 comprises a table frame 11 and a tabletop 12, under which the vehicle unit 2 can drive in.

The vehicle unit 2 and the manipulator unit 3 are designed as corresponding modules in such a way that the vehicle unit 2, which was driven in under the tabletop 12, can lift the manipulator unit 3 from the ground by lifting the guides 8 by means of the lifting unit 7 and can take it over for a change in location of the mobile robot 1. With the aid of the guides 8 and the locking elements 9, the manipulator unit 3 is taken over by the vehicle unit 2 in a fixed relative position and is fixed thereto.

In the example shown, the locking elements 9 are clamping chucks of a self-centering locking system, wherein the associated clamping pins are then formed on the manipulator unit 3 (concealed by the tabletop 11 in the representation). When lifting the lifting unit 7, the plug connection 10 is preferably also connected to a corresponding plug connection of the manipulator unit 3 (also not shown).

By lowering the lifting unit 7, the vehicle unit 2 can be relieved of the manipulator unit 3 resting thereon and can set the latter down on the surrounding ground. When further lowering the lifting unit 7, the locking elements 9 and/or the plug connection 10 can be autonomously detached so that the vehicle unit 2 can drive out from under the parked manipulator unit 3 again. The vehicle unit 2 is then in principle ready for use at a different place of use.

The table frame 11, which can be driven under, does not have to comprise the shown table legs for the arrangement of the tabletop 12 at the respective working height. The table frame 11, which can be driven under, could be lower or, where applicable, integrated into the underside of the tabletop 12 so that the tabletop 12 can thus be set down on a (permanently installed) substructure that has a suitable height and is stationary at the respective place of use. In these cases, the manipulator unit 3 can also be driven under on its underside in the described sense by the vehicle unit 2 and is designed to be tunnel-shaped for being received on the latter in a lockable/detachable manner.

In FIG. 3, it can also be seen that a roll magazine 13 and a deposition site 14 for temporarily depositing label rolls 6 and/or roll cores 6*a* are preferably formed on the tabletop 12.

The roll magazine 13 is designed to receive at least two and in particular at least four label rolls 6 and/or roll cores 6*a*—preferably in a lying alignment in each case. Label rolls 6 can thus be transported to the labeling assembly 50 on the mobile robot 1. Transporting away emptied roll cores 6*a*, no longer needed, on the roll magazine 13 is also possible.

The deposition site 14 serves primarily for temporarily depositing label rolls 6 and/or roll cores 6*a* during the change from an internal grip to an external grip (label rolls 6) or from an external grip to an internal grip (roll cores 6*a*).

Figure 5:
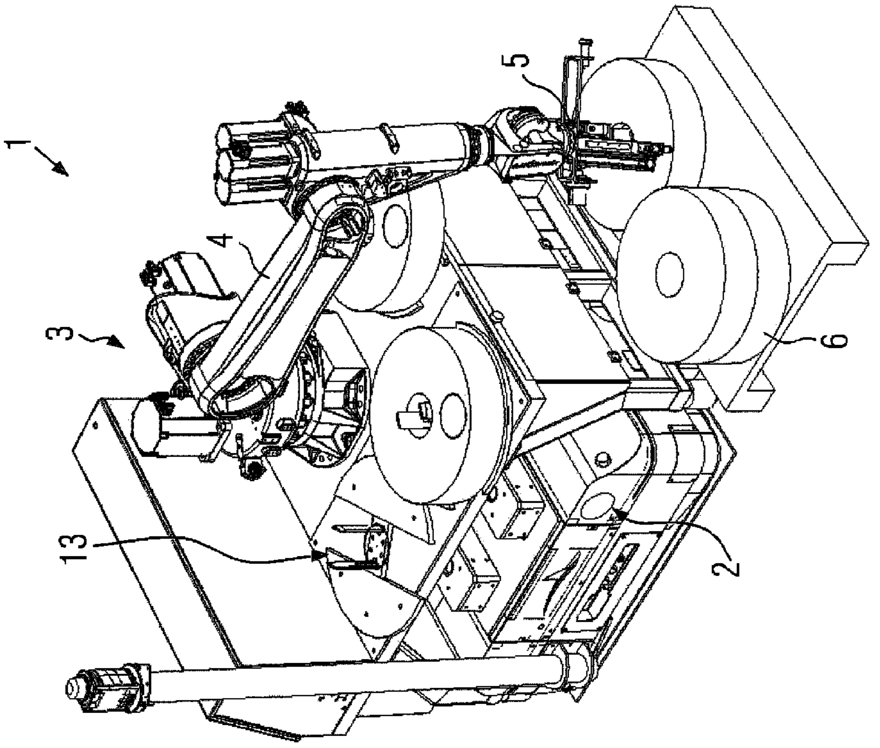
FIG. 5 shows the manipulator unit when a label roll is picked up with an internal grip.
Figure 4:
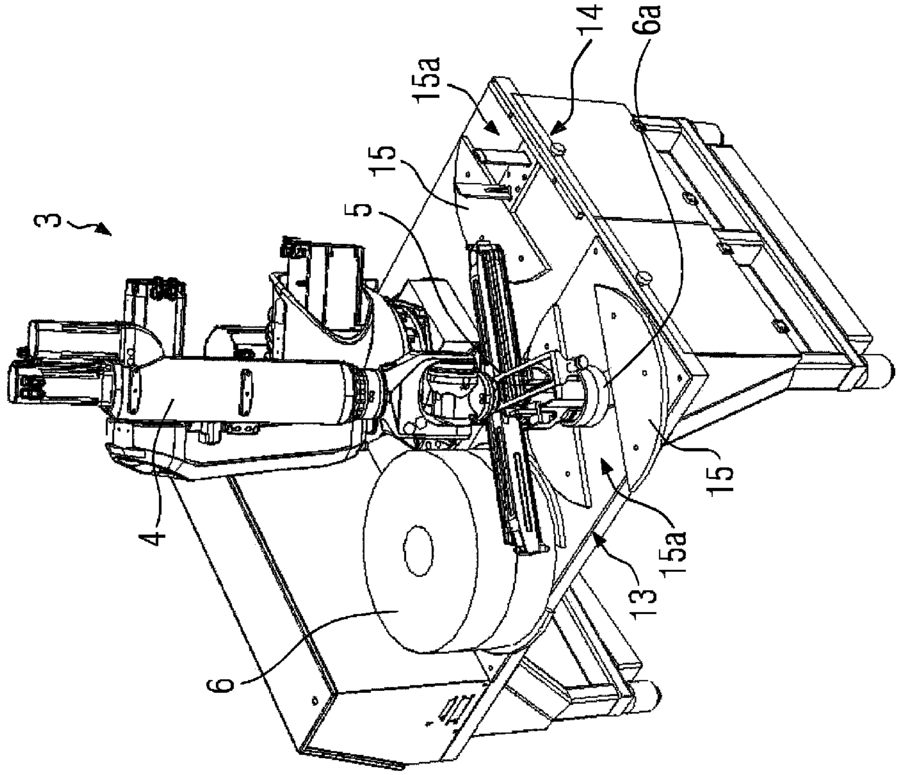
FIG. 4 shows the manipulator unit when a roll core is deposited.

Depositing a roll core 6*a* on the label magazine 13 with an internal grip is shown by way of example in FIG. 4. In contrast, FIG. 5 shows a label roll 6 being picked up with an internal grip from a supply of label rolls 6 provided on a pallet. It can be seen that the internal grip in principle enables stacked label rolls 6 to be picked up gently, viz., both from an available label roll supply and from the roll magazine 13.

It can be seen in particular in FIG. 4 that support plates 15 and recesses 15*a* formed therebetween are present in the area of the roll magazine 13 and the deposition site 14, enabling an external grip and a partial engagement under the label rolls 6 and/or the roll cores 6*a*. A flexible manipulation of the label rolls 6 and of the roll cores 6*a* in the area of the tabletop 12 is thus provided.

Figure 7:
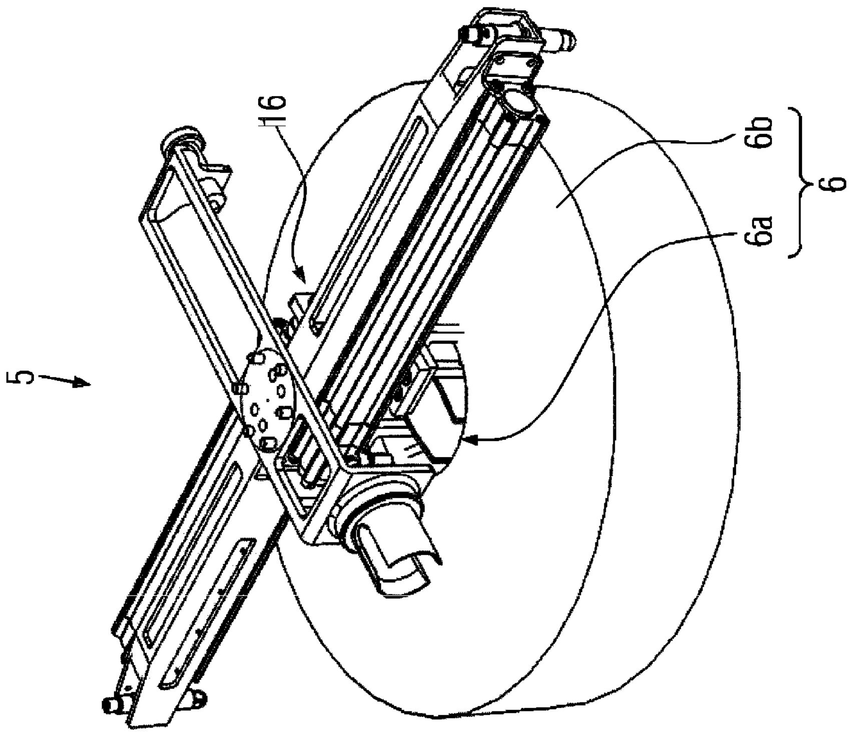
FIG. 7 shows the end effector with an internal grip.
Figure 6:
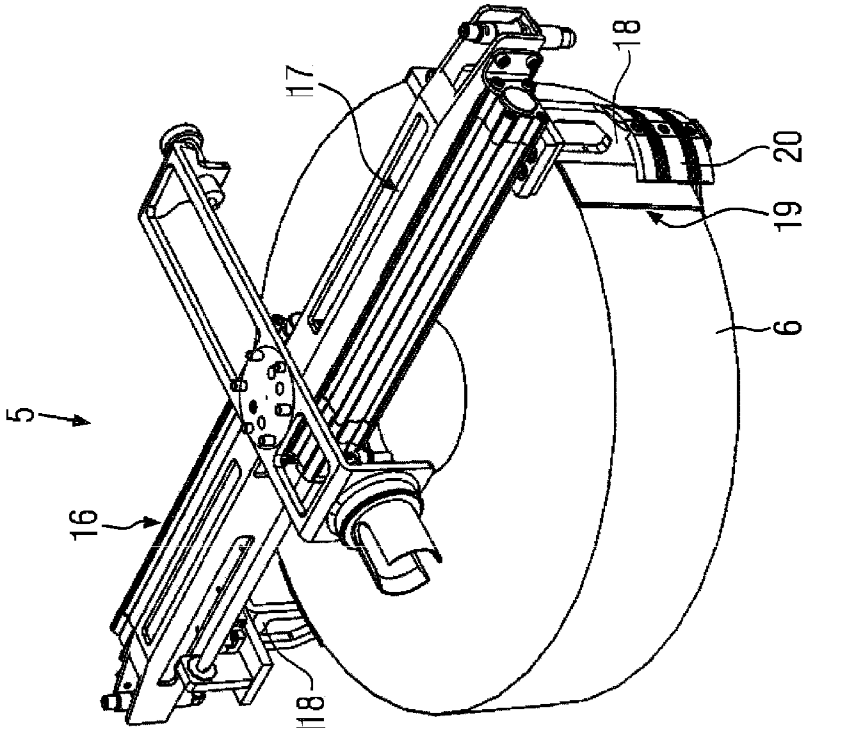
FIG. 6 shows the end effector with the greatest possible external grip.
Figure 8:
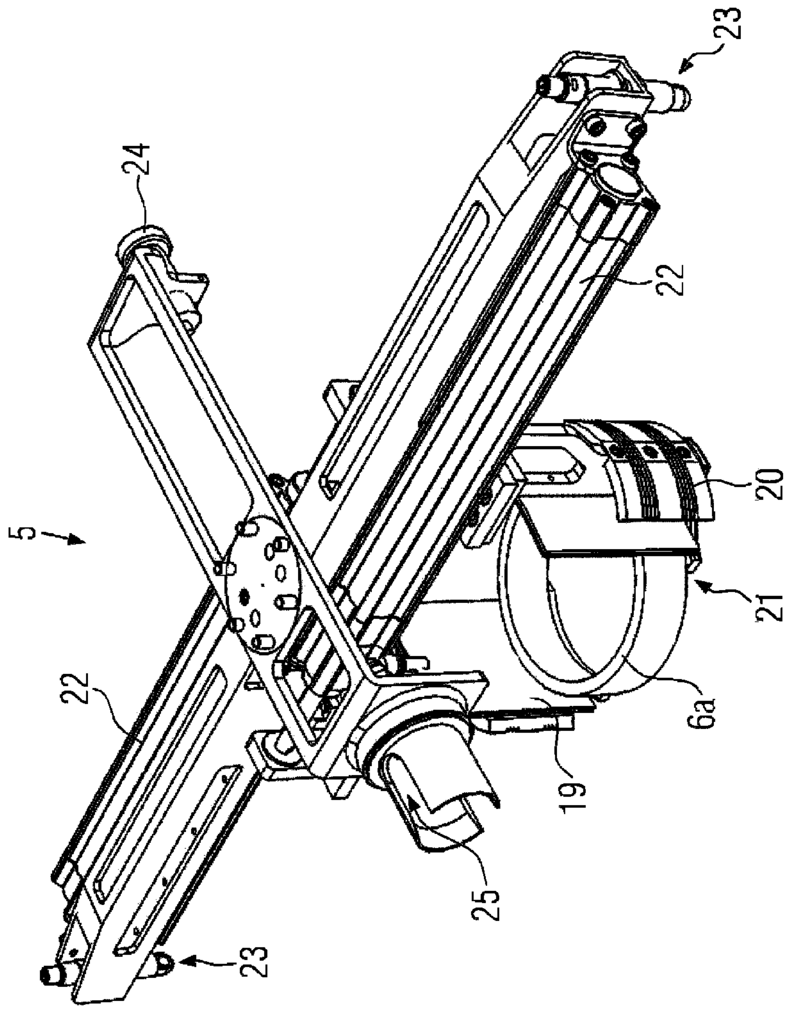
FIG. 8 shows the end effector with the smallest possible external grip.

FIGS. 6 to 8 illustrate the gripping functions of the end effector 5. Accordingly, the latter comprises a roll gripper 16 with gripping elements 18 formed on a linear drive 17. The gripping elements 18 have inward-directed contact surfaces 19 for the external grip of the label rolls 6 and of the emptied roll cores 6*a* as well as outward-directed contact surfaces 20 for the respective internal grip.

The mode of operation of the roll gripper 16 is based upon a linear movement of the two gripping elements 18 towards or away from one another, so that the label rolls 6 or roll cores 6*a* can be clamped in a carrying manner with the contact surfaces 19, 20 pointing inwards or outwards. In order to reduce the necessary clamping forces, the gripping elements 18 preferably each have support surfaces 21 which adjoin the inner contact surfaces 19 at the bottom and which can best be seen in FIG. 8. The label rolls 6 can thereby be supported on the end face during carrying.

The radii of curvature of the contact surfaces 19 for the external grip are, for example, adapted to the respective radius of curvature of the label rolls 6 or to the largest radius of curvature to be processed of the label rolls 6. The contact surfaces 19, 20 can, for example, be manufactured from metal sheets and are preferably provided with an anti-slip coating—for example, have an anti-slip mat glued to them. The risk of damage to the label rolls 6 can thereby be reduced. In addition, the friction between the label roll 6 and the contact surface 19 can be increased. The anti-slip coating is preferably elastically resilient and thus provides a soft and smooth contact surface for the label rolls 6.

The gripping elements 18 are driven on the linear drive 17—preferably by pneumatic cylinders 22. Alternatively, electric drives for the gripping elements 18 would also be conceivable. In order to ensure the gripping function in the event of a failure of the compressed air supply for the pneumatic cylinders 22, a locking unit (not shown) can be present on the end effector 5 in order to fix the piston rod of the pneumatic cylinder 22 in the event of failure of the compressed air supply. During normal operation, the locking unit is then supplied with compressed air when the gripping element 18 is extended, and thus releases the piston rod. In contrast, in the event of a drop in compressed air, the piston is frictionally clamped by a spring and thus fixed.

The pneumatic cylinders 22 can be controlled via separate valves in a manner known in principle. In this case, the control speed of the gripping elements 18 could be matched to one another—for example, with the aid of exhaust throttles.

As also shown in FIGS. 6 to 8, sensors 23—in particular, in the form of ultrasonic sensors—are preferably arranged on the end effector 5, with which sensors the position of the respectively held label roll 6 with respect to the end effector 5 can be determined. The sensors 23 serve to determine the position of the gripping elements 18 so that the center of the held label roll 6 can be calculated therefrom. This enables reliable control and manipulation even in the event that the label roll 6 cannot be picked up exactly in the middle with respect to the end effector 5 by the gripping elements 18. A calculated center of the label roll 6 can be transmitted to the controller of the multi-axle manipulator 4 in order to precisely manipulate the label roll 6.

FIGS. 6 and 8 show the smallest and largest diameters of label rolls 6 (or roll cores 6*a*) that can be manipulated with the end effector 5 in an external grip. In contrast, FIG. 7 shows a label roll 6 held with an internal grip—for example, when picking it up from a pallet.

The range of manipulatable diameters of label rolls 6 with an external grip is preferably at least 200 to 500 mm, and in particular at least 175 to 600 mm. Conventional formats of label rolls 6 and associated roll cores 6*a* can thus be handled flexibly.

FIGS. 6 to 8 also show an adhesion gripper 24 for holding free label strip ends, i.e., the starting areas of label strips, during the transfer thereof to the connection unit 53 of the labeling assembly 50. Alternatively, an electrostatic gripper or a suction gripper could in principle also be used at this point, for which purpose an additional vacuum supply would, if necessary, be present (not shown). The function of the adhesion gripper 24 is explained elsewhere with reference to FIG. 10.

Figure 9:
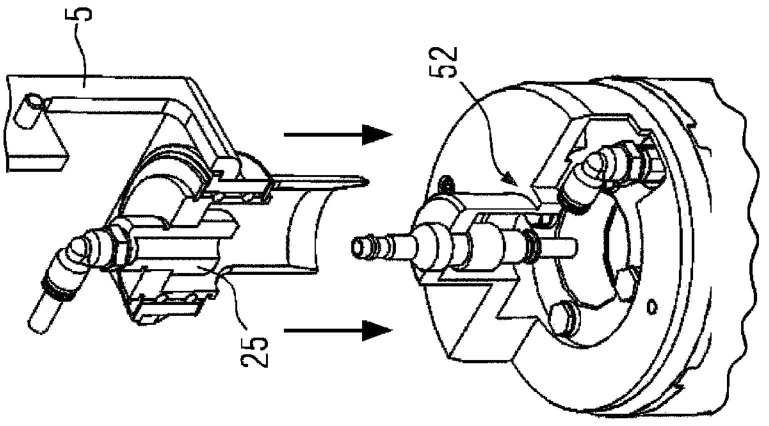
FIG. 9 shows compressed air connections of the end effector and of an expansion valve.

FIGS. 6 to 8 also show a compressed air connector 25 with which compressed air for the expansion valves 52 present at the roll plates 51 is provided; see FIG. 1 by way of example. The compressed air connector 25 is also shown in partial section in FIG. 9 during the approach to a corresponding expansion valve 52. By a compressed air supply produced in this way, the expansion valve 52 can be actuated automatically, in order to release empty roll cores 6*a*, to be removed, at the associated roll plate 51 and thereafter to place label rolls 6, equipped with a label strip 6*b*, thereon in exchange and to fix them by means of the expansion valve 52.

As also shown in FIGS. 6 to 8, the gripping elements 18, the adhesion gripper 24 or the similar gripper, and the compressed air connector 25 are arranged in a cross-shaped manner, wherein the roll gripper 16 substantially forms the one cross arm, and the adhesion gripper 24 and the compressed air connector 25 are arranged at the ends of the other cross arm. In connection with the degrees of freedom of the multi-axle manipulator 4, which is in particular designed in the form of a six-axle, articulated arm manipulator, this enables flexible and collision-free positioning of the roll gripper 16 on the label rolls 6 and roll cores 6*a*, of the adhesion gripper 24 or of the similar gripper on the connection unit 53, and of the compressed air connector 25 on the respective expansion valve 52.

Figure 10:
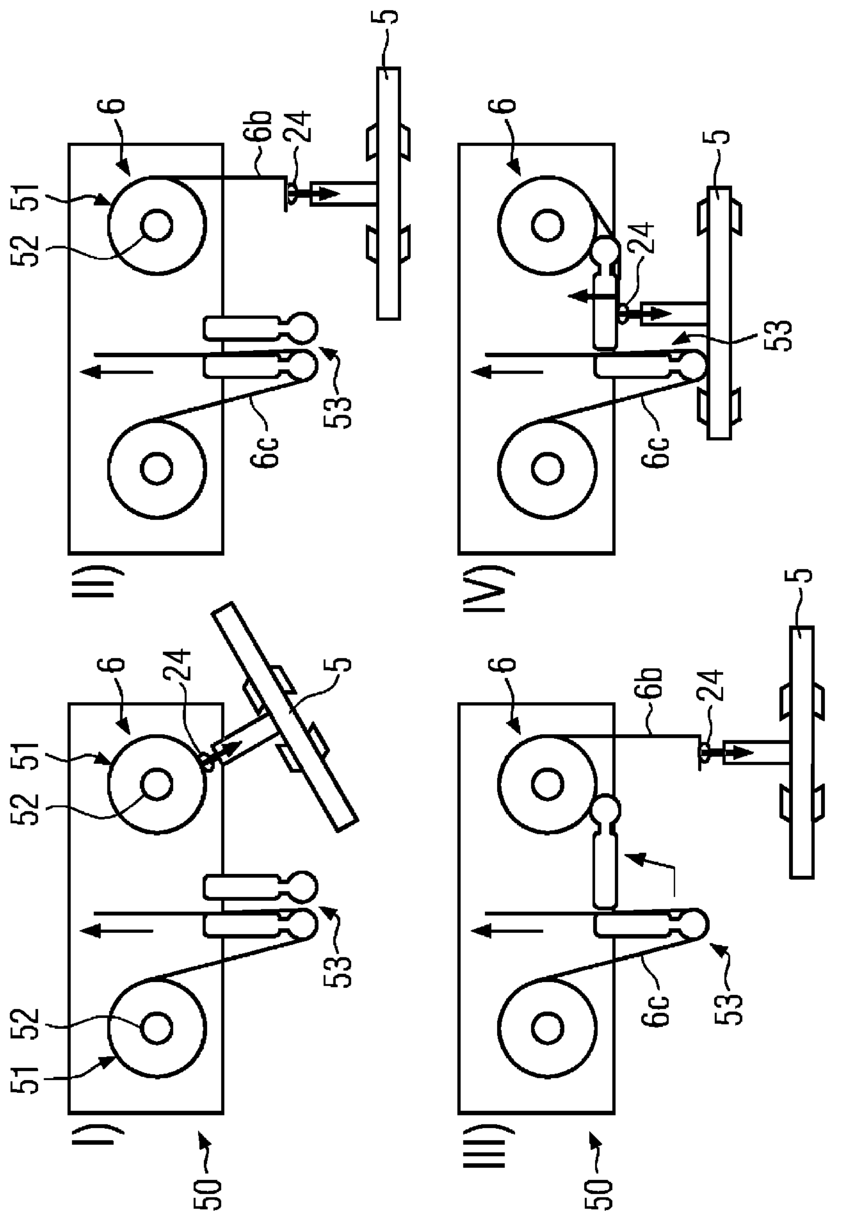
FIG. 10 shows a schematic representation of the label strip transfer to a connection unit of the labeling assembly.

FIG. 10 schematically shows the positioning of the adhesion gripper 24 (or of a corresponding suction gripper or electrostatic gripper) in the area of the connection unit 53 of the labeling assembly 50. Also shown schematically are their roll plates 51 with the expansion valves 52 present centrally thereon.

In step I, the adhesion gripper 24 is brought into contact with the free label strip end of the label roll 6 to be introduced.

In step II, the roll brake (not shown) of the roll plate 51 with the label roll 6 to be introduced is released so that, by unwinding the label strip 6*b* from the label roll 6, the free label strip end can be pulled back to such an extent that the connection unit 53 can be opened to insert the free label strip end.

A state with the connection unit 53 open (a fixing/clamping strip is unfolded) is shown in step III.

As can be seen in step IV, the end effector 5 can be moved with the adhesion gripper 24 and the label strip end held thereby to the open connection unit 53 in order to thereby transfer the label strip end to the connection unit 53. The latter can comprise assemblies, which are known in principle and therefore not explained in detail in this connection, for taking over label strip ends, for separating excess strip areas, and for attaching the label strip end to a label strip 6*c* unwound from the other roll plate 51 and already running through the labeling assembly 50. In the context of the invention described, the label strip ends are preferably welded to one another.

Apart from the control of the connection unit 53 for the automatic opening and closing thereof, the connection unit 53 can thus in principle have known functions for holding, preparing, and welding or gluing label strips.

The manipulation unit 3 can have inspection devices (not shown), such as at least one 2-D camera system or 3-D camera system, arranged in particular in the area of the end effector 5 in order to recognize, localize, and/or assess objects in the working area of the end effector 5 on the basis of image processing. For example, label rolls 6 to be picked up can be localized on a pallet in the x, y, and z directions. Furthermore, the label strip end to be transferred in each case to the connection unit 53 can be detected and, if necessary, also inspected qualitatively by means of imaging. Furthermore, by monitoring by means of imaging in the area of the end effector 5, it is possible to check the transfer of the label strip end to the connection unit 53 for correctness. Likewise, inspections of the label rolls 6 including their roll cores 6*a* in the sense of quality control can be performed.

The described roll magazine 13 is preferably designed for receiving label rolls 6 having a maximum height of 150 mm and a maximum diameter of 600 mm. If, for example, four receiving spaces for label rolls 6 are present on the roll magazine 13, up to four labeling assemblies 50 can be supplied with one label roll 6 each. In this case, removed empty roll cores 6*a* would either be discarded in the area of the respective labeling assembly 50 or could be transported away in the roll magazine 13 and/or on the deposition site 14.

For example, it is also possible to first deposit a removed empty roll core 6*a* onto the deposition site 14 and to subsequently place the label roll 6 to be introduced onto the previously deposited roll core 6*a* in the area of the deposition site 14, in order to facilitate a re-gripping from the internal grip to the external grip.

The positioning of the mobile robot 1 in the area of the labeling assembly 50 is, for example, possible as follows:

1. Positioning by means of a positioning aid arranged on the labeling assembly 50—for example, with at least one triangular geometry serving as a reference point. The mobile robot 1 can thus reproducibly navigate in the area of the labeling assembly 50 and approach target positions/working positions for the manipulator unit 3 with sufficient accuracy.
2. A camera system (not shown) present on the manipulator unit 3 makes it possible for the mobile robot 1 to navigate with respect to the labeling assembly 50 imaged therewith. This, for example, makes it possible to determine the relative position of the mobile robot 1/manipulator unit 3 with respect to the labeling assembly 50. For this purpose, a reference mark, e.g., a QR code or the like, can be present in the area of the labeling assembly 50, for example.
3. The positioning of the mobile robot 1 takes place by means of a docking station (not shown) on the labeling assembly 50. For this purpose, the mobile robot 1 drives to a target position in the area of the docking station and sets down the manipulator unit 3 in such a way that the latter mechanically docks to the docking station, whereby a defined relative position is assumed. In this case, it is also conceivable for the manipulator unit 3 to be electrically connected to the labeling assembly 50 during docking—for example, for energy supply and/or for data exchange. In this case, the vehicle unit 2 can subsequently disconnect from the manipulator unit 3 and drive to another place of use.

With the described supply system 100/mobile robot 1, it is possible to work with the following sequence of method steps, for example. Where applicable, two variants for the individual steps are conceivable, wherein the variant designated a) describes the procedure in connection with a central material handling station with a stationary robot (not shown), and variant b) describes the procedure without such a station:

1. The mobile robot 1 is positioned a) at a stationary robot or b) at, for example, a pallet with checked label rolls 6. However, label rolls 6 can also be provided differently—for example, on a table and/or magazine. Label rolls 6 can also, for example, first be checked by a camera system at the manipulator unit 3.
2. a) The label rolls 6 are picked up from a pallet by the stationary robot; or b) the multi-axle manipulator 4 of the mobile robot 1 autonomously picks up the label rolls 6 from a pallet with an internal grip.
3. The label rolls 6 are transferred to the roll magazine 13 of the mobile robot 1 either by the stationary robot or by the multi-axle manipulator 4 itself.
4. Up to four label rolls 6 preferably of a height of up to 150 mm and of a diameter of up to 600 mm are placed onto the roll magazine 13.
5. The mobile robot 1 is positioned at the labeling assembly 50, where applicable with the aid of at least one of the positioning aids and/or positioning methods mentioned above.
6. The multi-axle manipulator 4 guides the compressed air connector 25 to the expansion valve 52 of the roll plate 51 to be equipped.
7. After expansion of the expansion valve 52, the empty roll core 6*a* (used label roll 6) is removed from the roll plate 51 with an external grip by means of the roll gripper 16.
8. The removed roll core 6*a* is deposited onto the deposition site 14. If the roll magazine 13 is only incompletely filled, the roll core 6*a* can be deposited there.
9. A label roll 6 to be introduced is lifted out of the roll magazine 13 with an internal grip.
10. The label roll 6 is deposited onto the deposition site 14, where applicable onto a roll core 6*a* previously deposited there. Where applicable, temporary deposition in the area of the roll magazine 13 is also conceivable—for example, if comparatively flat label rolls 6 of up to 50 mm height are processed, or only comparatively few labeling assemblies 50 are to be supplied.
11. The roll gripper 16 changes from the internal grip to the external grip and picks up the temporarily deposited label roll 6 with an external grip.
12. The label roll 6 is thus transferred to the free roll plate 51 and deposited thereon.
13. The expansion valve 52 of the relevant roll plate 51 is subsequently actuated (for example, by supplying compressed air at 6 bar) by re-attachment of the compressed air connector 25, and the label roll 6 is thus fixed on the roll plate 51.

The connection of the label strip 6*b* (its start) of the introduced label roll 6 to the labeling assembly 50 can, for example, be carried out as follows:

14. The free label strip end is, for example, detected and localized in the area of the end effector 5 by means of imaging.
15. The label strip end is picked up with the aid of the adhesion gripper 24 or a similarly functioning and arranged gripper of the end effector 5.
16. The connection unit 53 is opened fully automatically—for example, by pivoting it open by means of a pneumatic cylinder.
17. The multi-axle manipulator 4 moves the end effector 5 with the adhesion gripper 24 and the label strip end held therewith into the open connection unit 53.
18. The multi-axle manipulator 4, for example, places the end of the label strip 6*b* on a vacuum strip formed on the connection unit 53, which vacuum strip takes over the label strip end as a result.
19. During assembly/trimming of the label strip end, the adhesion gripper 24 can then also temporarily fix the label strip end until final transfer to the connection unit 53. The transfer can take place by means of vacuum strips and clamping strips of the connection unit 53.
20. The adhesion gripper 24 can subsequently be retracted again.

A fully automatic transfer of label rolls 6 to labeling assemblies 50 is thus possible, optionally including a fully automatic connection of the introduced label strip 6 to a further label strip 6*c* already guided through the labeling assembly 50.

In particular, an ergonomically problematic manual handling of label rolls 6 up to the deposition thereof on the roll plates 51 of labeling assemblies 50 can thus be avoided.

In addition, efficient and full utilization of the mobile robot 1 is possible—where applicable, a flexible combination of vehicle units 2 and manipulator units 3—in that they are also used separately from one another or in different combinations with one another.

The invention claimed is:

1. Mobile robot for changing label rolls on a labeling assembly for labeling containers, with a vehicle unit for changing locations of the robot and with a manipulator unit comprising a multi-axle manipulator with an end effector for manipulating label rolls, wherein the end effector is designed to grip an outer circumference of the label rolls and emptied roll cores of label rolls so as to carry them, wherein the end effector is further designed to engage in the roll cores of the label rolls in such a way that the label rolls can be carried and deposited with an internal grip, and wherein the manipulator unit comprises a label roll magazine for receiving at least two label rolls in a lying state and a deposition site for temporarily depositing a label roll during manipulation.

2. Mobile robot according to claim 1, wherein the vehicle unit and the manipulator unit are designed as modules that can be coupled to one another and detached from one another by means of a lifting unit formed on the vehicle unit, in such a way that the manipulator unit can be lowered with respect to the vehicle unit for stationary parking and/or docking to the labeling assembly, and can in contrast be lifted again to change locations.

3. Mobile robot according to claim 1, wherein the manipulator unit comprises a table frame and a tabletop, under which the vehicle unit can drive and on which the multi-axle manipulator is mounted.

4. Mobile robot according to claim 1, wherein the end effector further comprises an adhesion gripper, electrostatic gripper, or suction gripper for gripping label tape ends of the label rolls.

5. Mobile robot according to claim 1, wherein a compressed air connector for providing compressed air is also arranged on the end effector in order to therewith actuate expansion valves for fixing/releasing label rolls on roll plates of labeling assemblies.

6. Mobile robot according to claim 1, wherein sensors are arranged on the end effector, for determining a relative position of one or more of the label rolls received in each case by the end effector.

7. Mobile robot according to claim 6, wherein the sensor are ultrasonic sensors.

8. Mobile robot according to claim 1, wherein the manipulator unit comprises at least one interface for selective electrical energy supply of the multi-axle manipulator from the vehicle unit or from the labeling assembly.

9. Mobile robot according to claim 8, wherein the interface includes a plug connection.

10. Supply system for introducing a label roll into a labeling assembly for labeling containers, comprising the mobile robot according to claim 1 and the labeling assembly, which comprises roll plates for receiving and unwinding label rolls, and a connection unit, by means of which a label strip of the introduced label roll can be connected to a label strip guided through the labeling assembly to the containers.

11. Mobile robot according to claim 1, wherein the multi-axle manipulator is a 6-axle articulated arm manipulator.

12. Mobile robot according to claim 1, wherein the label roll magazine is for receiving at least four label rolls, and wherein the label roll magazine is for changing from an internal grip to an external grip.

13. Method for changing label rolls on a labeling assembly for labeling containers, wherein, by means of a multi-axle manipulator and an end effector formed thereon, a mobile robot removes at least one emptied roll core of a label roll with an external grip from the labeling assembly and introduces a label roll with an external grip there in exchange, wherein the end effector picks up the label roll with an internal grip and deposits it, in a lying state, in a roll magazine carried along on the mobile robot, and wherein the label roll is temporarily deposited during manipulation on a deposition site of the mobile robot.

14. Method according to claim 13, wherein the mobile robot receives label rolls by means of the end effector into a roll magazine carried along, transports the label rolls therein to the labeling assembly, and provides them for changing label rolls.

15. Method according to claim 13, wherein, during a change of label rolls, a modular manipulator unit, comprised by the mobile robot, with the multi-axle manipulator is operated on a modular vehicle unit comprised by the mobile robot.

16. Method according to claim 15, wherein, after positioning the manipulator unit at the labeling assembly, the vehicle unit is uncoupled from the manipulator unit and, before re-coupling, drives to at least one other modular manipulator unit and temporarily forms a further mobile robot therewith.

17. Method according to claim 13, wherein a starting area of a label strip present on the introduced label roll is picked up by an adhesion gripper, electrostatic gripper, or suction gripper arranged on the end effector and is transferred to a connection unit, formed on the labeling assembly, for connecting label strips.

* * * * *